US011578011B2

(12) United States Patent
Noe-Hays et al.

(10) Patent No.: US 11,578,011 B2
(45) Date of Patent: Feb. 14, 2023

(54) FREEZE CONCENTRATION FOR URINE-BASED FERTILIZER PRODUCTION

(71) Applicant: The Regents of the University of Michigan, Ann Arbor, MI (US)

(72) Inventors: Abraham Noe-Hays, Putney, VT (US); Nancy Love, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 827 days.

(21) Appl. No.: 16/541,846

(22) Filed: Aug. 15, 2019

(65) Prior Publication Data

US 2020/0055792 A1    Feb. 20, 2020

Related U.S. Application Data

(60) Provisional application No. 62/764,934, filed on Aug. 15, 2018.

(51) Int. Cl.
| | | |
|---|---|---|
| C05F 3/06 | (2006.01) | |
| F25B 29/00 | (2006.01) | |
| B01D 9/00 | (2006.01) | |
| B01D 9/04 | (2006.01) | |
| C02F 1/22 | (2023.01) | |
| A23L 2/12 | (2006.01) | |
| G01N 1/40 | (2006.01) | |
| C05F 3/00 | (2006.01) | |

(52) U.S. Cl.
CPC ............. *C05F 3/06* (2013.01); *A23L 2/12* (2013.01); *B01D 9/0013* (2013.01); *B01D 9/0059* (2013.01); *B01D 9/0063* (2013.01); *B01D 9/04* (2013.01); *C02F 1/22* (2013.01); *F25B 29/00* (2013.01); *G01N 1/4055* (2013.01); *C05F 3/00* (2013.01); *Y02A 40/20* (2018.01); *Y02P 20/145* (2015.11); *Y02W 30/40* (2015.05)

(58) Field of Classification Search
CPC ..... C05F 3/06; C05F 3/00; A23L 2/12; B01D 9/0013; B01D 9/0059; B01D 9/0063; B01D 9/04; C02F 1/22; F25B 29/00; G01N 1/4055; Y02W 30/40; Y02P 20/145; Y02A 40/20
USPC ......................................................... 62/532
See application file for complete search history.

(56) References Cited

U.S. PATENT DOCUMENTS

| | | |
|---|---|---|
| 2005/0050917 A1 | 3/2005 | Kagitani |
| 2010/0071446 A1 | 3/2010 | Brown |
| 2010/0108294 A1 | 5/2010 | Feldmann |
| 2011/0229870 A1 | 9/2011 | Seidel |

FOREIGN PATENT DOCUMENTS

WO    2006003968 A1    1/2006

OTHER PUBLICATIONS

International Preliminary Report on Patentability in International Patent Application No. PCT/US2019/046660, dated Feb. 16, 2021, 7 pages.
Arquiza et al., "Studies on the Use of Conductive Porous Media Distillation and Thermoelectric Freeze-Concentration for Water Recovery in Space Exploration", 44th International Conference on Environmental Systems, Jul. 2014, 17 pages.
Gulyas et al., "Freeze Concentration for Enrichment of Nutrients in Yellow Water from No-Mix Toilets", Water Science and Technology, 2004, pp. 61-68, vol. 50, No. 6.
International Search Report and Written Opinion in corresponding PCT application No. PCT/US2019/046660, dated Dec. 4, 2019, 10 pages.
Maurer et al., "Treatment Processes for Source-Separated Urine", Water Research, 2006, pp. 3151-3166.

*Primary Examiner* — Edward M Johnson
(74) *Attorney, Agent, or Firm* — Lempia Summerfield Katz LLC

(57) ABSTRACT

A system for generating a concentrated product from a feedstock includes a feedstock chamber to which the feedstock is provided, a heat exchanger assembly in thermal communication with the feedstock chamber, the heat exchanger assembly being configured to freeze the feedstock in the feedstock chamber, an output flow arrangement configured to carry liquid from the feedstock chamber as the feedstock thaws, the output flow arrangement comprising a flow controller, a sensor disposed along the output flow arrangement or the heat exchanger assembly, the sensor being configured to measure a characteristic of the liquid, the characteristic being indicative of a solute concentration level of the liquid or the heat exchanger assembly, and a processor responsive to the characteristic and configured to control the flow controller to, based on the solute concentration level, direct the liquid passing through the output flow arrangement to define a plurality of products at different concentration levels, the plurality of products comprising the concentrated product.

14 Claims, 3 Drawing Sheets

FREEZE CONCENTRATION FOR URINE-BASED FERTILIZER PRODUCTION

CROSS-REFERENCE TO RELATED APPLICATION

This application claims the benefit of U.S. provisional application entitled "Freeze Concentration for Urine-Based Fertilizer Production," filed Aug. 15, 2018, and assigned Ser. No. 62/764,934, the entire disclosure of which is hereby expressly incorporated by reference.

STATEMENT REGARDING FEDERALLY SPONSORED RESEARCH OR DEVELOPMENT

This invention was made with government support under Contract No. 1639244 awarded by the National Science Foundation (NSF). The government has certain rights in the invention.

BACKGROUND OF THE DISCLOSURE

Field of the Disclosure

The disclosure relates generally to the production of urine-based fertilizer and other concentrated products.

Brief Description of Related Technology

A human adult typically produces approximately 150 gallons of urine each year. This urine contains a significant amount of nutrients for fertilizer. But the large volume of the urine makes it difficult to store and transport to farms where the nutrients can be used, especially if urine is collected in cities far from agricultural areas.

A variety of procedures have been used to remove water from urine and thereby reduce its volume to create a concentrated product. These procedures include distillation, evaporation, freeze/thaw, and reverse osmosis. Some of the procedures, such as reverse osmosis, may have a higher energy efficiency than others. But reverse osmosis has one major drawback. The nitrogen in stored in urine is largely in the form of ammonia. Only a portion of the ammonia is able to pass through a membrane of the reverse osmosis procedure. A substantial amount of the nitrogen is therefore lost rather retained in the concentrate.

SUMMARY OF THE DISCLOSURE

In accordance with one aspect of the disclosure, a system for generating a concentrated product from a feedstock includes a feedstock chamber to which the feedstock is provided, a heat exchanger assembly in thermal communication with the feedstock chamber, the heat exchanger assembly being configured to freeze the feedstock in the feedstock chamber, an output flow arrangement configured to carry liquid from the feedstock chamber as the feedstock thaws, the output flow arrangement including a flow controller, a sensor disposed along the output flow arrangement or the heat exchanger assembly, the sensor being configured to measure a characteristic of the liquid or the heat exchanger assembly, the characteristic being indicative of a solute concentration level of the liquid, and a processor responsive to the characteristic and configured to control the flow controller to, based on the solute concentration level, direct the liquid passing through the output flow arrangement to define a plurality of products at different concentration levels, the plurality of products including the concentrated product.

In accordance with another aspect of the disclosure, a method for generating a concentrated product from a feedstock includes providing the feedstock to a feedstock chamber, controlling a heat exchanger assembly disposed relative to the feedstock chamber to freeze the feedstock in the feedstock chamber, determining a characteristic of liquid exiting the feedstock chamber as the feedstock thaws, the characteristic being indicative of a solute concentration level of the liquid, and controlling a flow controller based on the characteristic to direct the liquid to define a plurality of products, the plurality of products including the concentrated product.

In accordance with yet another aspect of the disclosure, a heat exchanger assembly for generating a concentrated product from a urinary feedstock includes a feedstock chamber, a cooling chamber disposed along an upper side of the feedstock chamber such that delivery of a cooling fluid to the cooling chamber freezes the urinary feedstock from top to bottom within the feedstock chamber, and a heating chamber disposed along a lower side of the feedstock chamber such that delivery of a heating fluid to the heating chamber thaws the urinary feedstock from the bottom to the top within the feedstock chamber.

In connection with any one of the aforementioned aspects, the systems, devices, and/or methods described herein may alternatively or additionally include any combination of one or more of the following aspects or features. The output flow arrangement includes a plurality of output paths through which the plurality of products are directed, respectively. The flow controller includes a set of pumps, each pump of the set of pumps providing the liquid to a respective one of the plurality of output paths. The heat exchanger assembly includes a thermal transfer fluid chamber to which a thermal transfer fluid is provided. Each of the feedstock chamber and the thermal transfer fluid chamber includes a respective shell, the respective shells of the feedstock chamber and the thermal transfer fluid chamber are stacked. The thermal transfer fluid chamber is adjacent an upper side of the feedstock chamber such that the feedstock freezes in the feedstock chamber from top to bottom. The system controller is configured to regulate thermal transfer fluid flow to the thermal transfer fluid chamber such that the feedstock does not completely freeze before thawing. The heat exchanger assembly includes first and second thermal transfer fluid chambers. The first and second thermal transfer fluid chambers are disposed on opposite sides of the feedstock chamber. First and second thermal transfer fluids are provided to the first and second thermal transfer fluid chambers to freeze and thaw the feedstock in the feedstock chamber, respectively. The processor is further configured to regulate thermal transfer fluid flow through the heat exchanger assembly to control rates of freezing and thawing of the feedstock based on the characteristic. The feedstock chamber includes a flexible bag. The sensor includes a conductivity sensor immersed in the liquid in the output flow arrangement. The sensor includes a temperature sensor. The heat exchanger assembly is disposed on an inclined orientation such that the liquid drains out of the feedstock chamber as the feedstock thaws. The method further includes providing a thermal transfer fluid to a cooling chamber, the cooling chamber being disposed relative to the feedstock chamber to freeze the feedstock in the feedstock chamber, and regulating thermal transfer fluid flow through the cooling chamber to establish a degree to which, and/or a rate at which, the feedstock freezes before thawing. The method further includes providing thermal transfer fluid to a heating chamber, the heating chamber being disposed relative to the feedstock chamber to thaw the feedstock in the feedstock chamber. The method further includes regulating thermal transfer fluid flow through a cooling chamber and a heating chamber to control rates of freezing and thawing of the feedstock based on the characteristic. Controlling the flow controller includes directing the liquid to a plurality of containers via a plurality of output paths, respectively, such that the plurality of containers have respective fractions of the liquid with differing solute concentration levels. The method further includes returning a fraction of the liquid to the feedstock chamber. Controlling the heat exchanger assembly includes transmitting data indicative of the characteristic to a remote computer, and receiving control data for the heat exchanger assembly from the remote computer.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
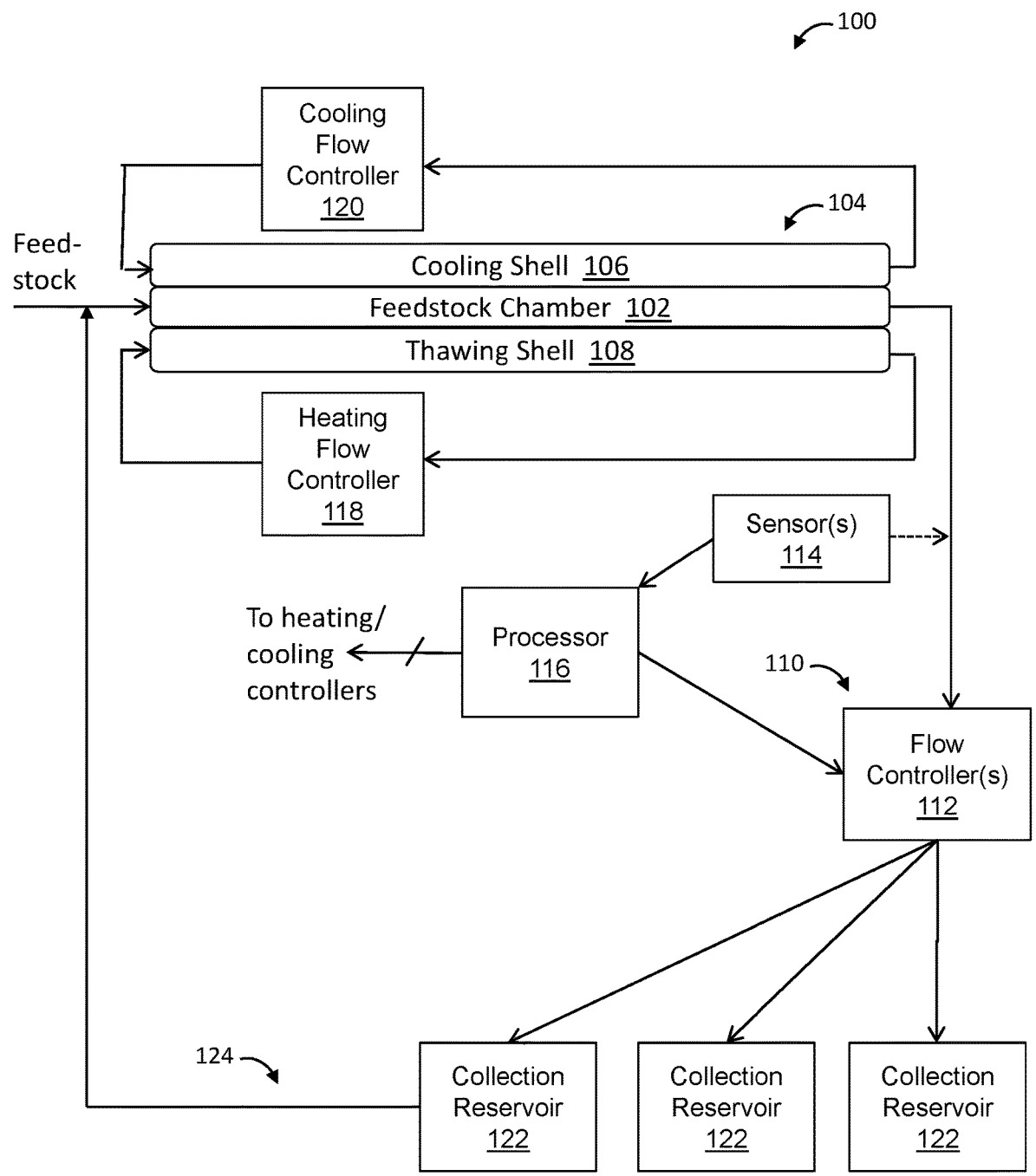
FIG. 1 is a block diagram of a system for generating a concentrated product from a urinary feedstock in accordance with one example.

The embodiments of the disclosed systems, assemblies, and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Systems, heat exchanger assemblies, and methods for generating a concentrated product from a urinary feedstock are described. The disclosed systems and methods remove water from the urinary feedstock (e.g., urine or urine-derived liquid feedstock) by partially or completely freezing the feedstock, then removing (e.g., draining off) a fraction of the feedstock as a concentrated product. The concentrated product may correspond with the fraction of the feedstock that remained after the freezing stage is completed. The concentrated product may alternatively or additionally correspond with a fraction of the liquid first produced during thawing. During operation, a plurality of products at different concentration levels are defined as the urinary feedstock thaws.

The concentration levels of the liquid products of the disclosed systems, assemblies, and methods are established through sensing a characteristic of the liquid and/or a heat exchanger assembly. The characteristic is indicative of the concentration level of the product. For instance, the remaining or otherwise produced liquid may pass through or by, or is otherwise analyzed by one or more sensors, such as a conductivity sensor, to determine a solute concentration level of the liquid. As described below, various types of sensors may be used, including, for instance, a color sensor, an opacity sensor, a temperature sensor (e.g., thermometer), a float sensor, a conductivity sensor, or a flow sensor. Thus, the characteristic (e.g., conductivity, temperature, volume, etc.) measured by the sensor(s) may vary accordingly, while still being indicative of solute concentration level. Still other types of sensors may indirectly measure a characteristic of the produced liquid. For example, the heat flux through the heat exchanger assembly, or the temperature of the remaining ice or the feedstock chamber walls, may provide an indication of the present concentration level.

The produced liquid is directed through an output flow arrangement using the measured characteristic and, thus, concentration level, as a controlling parameter. The output flow arrangement is configured to define the multiple products. For instance, the produced liquid may be selectively directed to one of a plurality of containers or other output paths, one container or output path at a time as the concentration level lowers over time. Controlling the direction of the liquid may thus produce liquid fractions of differing concentration levels in each of the containers.

In some cases, the urinary feedstock is frozen, e.g., partially frozen, by a heat exchanger assembly in thin ice sheets or blocks. In some cases, the heat exchanger assembly includes one or more shells stacked adjacent to the feedstock chamber for thermal transfer therewith. The thickness of the ice sheet may be less than about one-fifth of its length or width, such as about one-tenth. A variety of shapes and dimensions may be used. For example, the heat exchanger assembly may be configured as or otherwise include a heat sink having a number of thermal transfer fins or other elements configured for disposition within the feedstock chamber, thereby defining a number of thin spaces within the feedstock chamber.

In some cases, the urinary feedstock is frozen in a sheet or block oriented in a horizontal or inclined position, with the heat being removed from the upward-facing surface. The frozen urine may additionally or alternatively be thawed while disposed at an incline (e.g., on an inclined surface), such that liquid is drained by gravity.

Although described in connection with heat exchanger assemblies having shells arranged in a stacked configuration with the feedstock chamber, the disclosed systems and methods are useful in connection with a wide variety of heat exchanger configurations. For instance, the manner in which heat is removed for freezing, and/or added for thawing, may vary. Various types of heat exchanger assemblies may thus be used in conjunction with the sensor-based measurement(s) to control production.

FIG. 1 depicts a system 100 for generating a concentrated product from a urinary feedstock in accordance with one example. The system 100 includes a feedstock chamber 102 to which the feedstock is provided, and a heat exchanger assembly 104 (or freeze concentration assembly) in thermal communication with the feedstock chamber 102. The heat exchanger assembly 104 is configured to freeze the urinary feedstock in the feedstock chamber 102. In some cases, the heat exchanger assembly 104 includes a number of compartments or other chambers for circulation of one or more thermal transfer fluids. In this case, the assembly includes two thermal transfer fluid chambers 106, 108 on opposite sides of the feedstock chamber 102. The thermal transfer fluid chambers 106, 108 are configured as, or otherwise include, a cooling chamber 106 and a heating chamber 108.

Any number of feedstock chambers 102 and/or heat exchanger assemblies 104 may be included, e.g., for operation in parallel.

Walls and/or other aspects of the feedstock chamber 102 and the thermal transfer fluid chambers 106, 108 may be configured to facilitate heat transfer to or from the feedstock chamber 102. For instance, one or more of the feedstock chamber 102 and the thermal transfer fluid chambers 106, 108 may have one or more walls or other components composed of (or otherwise including) sheet metal. Alternatively or additionally, the feedstock chamber 102 may be or include a flexible bag, such as a bag composed of a polyester film. Other types of films or membranes may be used. The flexibility may be useful to allow for thermal expansion during freezing. Any material(s) that prevent liquid from flowing from one chamber into another, but allow the flow of heat from one chamber to another through the chamber wall, may be used.

Figure 2:
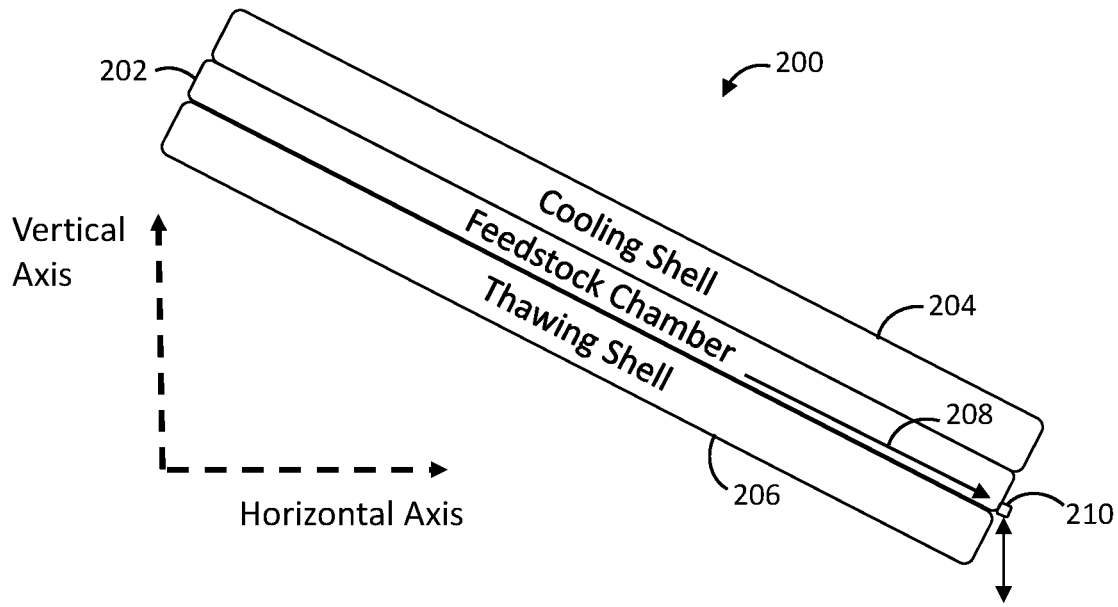
FIG. 2 is a schematic view of a heat exchanger assembly for use in generating a concentrated product from a urinary feedstock in accordance with one example.

As shown in FIGS. 1 and 2, the feedstock chamber 102 and the thermal transfer fluid chambers 106, 108 may be disposed in a stacked arrangement. For example, the feedstock chamber 102 and the heat exchanger assembly 104 may be arranged as stacked shells or plates.

The feedstock chamber 102 and the thermal transfer fluid chambers 106, 108 may be operated or configured as alternating "freeze chambers" and "heat exchange chambers". The freeze chambers 102 are filled with urinary feedstock (e.g., urine or processed urine material), while the heat exchange chambers 106, 108 are configured for circulation of a heat-transfer fluid or liquid, such as glycol. Alternative or additional liquids or fluids may be used for heat transfer. For example, the heat transfer fluid may be or include water or air.

In one example, during a freezing phase, heat moves from the feedstock in the feedstock (or freeze) chambers 102 into the heat-transfer fluid in the heat exchange chamber 106, resulting in the feedstock chilling to below the freezing point and the formation of ice crystals within the feedstock. Alternatively, heat is removed by the heat-transfer fluid in both of the heat exchange chambers 106, 108. In some cases, once a desired degree of freezing of the feedstock has been attained, any remaining free liquid contains a high concentration of solutes and is drained off or otherwise removed as one product (e.g., a concentrated product) of the system 102. Then warm (e.g., above freezing point) heat-transfer liquid is circulated through one or both of the heat exchange chambers 106, 108, transferring heat to the frozen feedstock in the freeze chamber 102, causing the frozen feedstock to melt.

The first liquid to drain from the melting feedstock (as well as any free liquid that failed to freeze in some cases) is highly concentrated relative to the original feedstock. As the frozen feedstock continues to melt, the solute concentration decreases. As the concentration of the melting liquid changes, the resulting fractions are diverted to a series of containers or other output paths (e.g., for secondary processes). For example, the thawed liquid may be separated into three fractions or products: 1) a concentrated product fraction, 2) a fraction with concentration similar to the feedstock, which is recycled into another freeze cycle, and 3) a low-concentration fraction that is directed to disposal or recycled for other uses. Additional, fewer, or alternative fractions or products may be produced. For example, multiple concentrated products of different concentration levels may be produced.

The system 100 may include multiple sets of alternating feedstock chambers 102 and thermal transfer fluid exchange chambers 106, 108. The feedstock chambers 102 and the thermal transfer fluid exchange chambers 106, 108 may be constructed or otherwise configured as an integrated block. Alternatively, the feedstock chambers 102 and the thermal transfer fluid exchange chambers 106, 108 may be discrete components that may be coupled and decoupled in a modular way.

Additional, fewer, or alternative thermal transfer fluid chambers 106, 108 may be used. For example, a single thermal transfer fluid chamber may be used for both cooling and heating. In other cases, thermal transfer (e.g., thawing) may be provided in a way not involving a thermal transfer fluid chamber (e.g., via the ambient or another mechanism).

The system 100 further includes an output flow arrangement 110 configured to carry liquid from the feedstock chamber 102 as the urinary feedstock thaws. The output flow arrangement 110 includes one or more flow controllers 112. In the example of FIG. 1, the flow controller 112 is coupled to the feedstock chamber 102 via a pipe or tube. In other cases, the flow path between the feedstock chamber 102 and the flow controller 112 includes further tubing and/or other elements.

The system 100 further includes one or more sensors 114 and a system controller 116 to control the operation of various components of the system 100. Each sensor 114 is configured to measure a characteristic of the liquid or the heat exchanger assembly 104. The characteristic is indicative of a solute concentration level of the liquid. Each sensor 114 is disposed along the output flow arrangement 110 upstream of the flow controller 112. For example, the sensor 114 may be immersed or disposed within the output flow. In such cases, the sensor 114 may be or include a conductivity sensor or a thermometer. The location, type, and other characteristics of the sensor(s) may vary. For instance, the sensor 114 may be or include an optical sensor adjacent the output flow. Alternative or additional characteristics of the liquid or the heat exchanger assembly 104 may be sensed, including, for instance, the volume or flow rate of the liquid, or heat flux through one or more components of the system (e.g., one of the shells). In some cases, the heat flux may be measured by sensing the flow rate of the thermal transfer fluid and/or the temperature difference in the thermal transfer fluid as it flows into and out of thermal transfer fluid chamber. The sensor(s) 114 associated with such characteristics accordingly may or may not be exposed to the liquid. A sensor not in contact with the liquid may be more robust. In contrast, sensors exposed to the liquid may involve routine cleaning or other maintenance, or replacement due to, for instance, corrosion.

The system controller 116 is responsive to the characteristic measured by the sensor(s) 114. The system controller 116 is configured to control the flow controller 112 to select a respective output path of the output flow arrangement based on the solute concentration level. The system controller 112 may also use the solute concentration level to regulate or otherwise control the flow(s) of thermal transfer fluid(s) to the thermal transfer fluid chamber(s) 106, 108 via one or more additional flow controllers. In the example of FIG. 1, the system 100 includes a heating flow controller 118 and a cooling flow controller 120. The degree to which, and/or the rate at which, the feedstock freezes or thaws may thus be controlled. Additional parameters may be processed by the system controller 116 to select the output path and/or regulate the thermal transfer fluid flow.

The system controller 116 is or includes one or more processors configured to generate control signals for the flow controllers. In the example of FIG. 1, the system controller 116 includes a single processor, such as a field programmable gate array. Other types of processors may be used, including, for instance, various types of microcontrollers and microprocessors. The processors may be components of an automated control system. The control system may provide functionality in addition to managing the flows of liquid and heat. For instance, the control system may provide or support remote data logging and other operational management. In some cases, data pertaining to the temperature, rate of freezing or thawing, rate of liquid production, temperature of drained liquid, conductivity of drained liquid, and other measures are read and logged periodically, and are uploaded to the internet or cloud service in a way that makes the data accessible remotely. Operation during the freezing and thawing phases may be monitored and controlled remotely, such as through the internet.

The processor(s) of the system controller 116 is/are configured to control the flow controller 112 to, based on the solute concentration level, direct the liquid passing through the output flow arrangement 110 to define a plurality of products at different concentration levels. In the example of FIG. 1, the output flow arrangement 110 includes a plurality of containers (e.g., collection reservoirs) 122. The fractions of the thawed liquid are directed to the different containers 122 of the flow by the flow controller(s) 112 to define the products.

The configuration and other characteristics of the flow controller(s) 122 and the output flow arrangement 110 for directing the thawed liquid may vary. For example, each flow controller 122 may include one or more pumps (e.g., peristaltic pumps) and/or one or more valves. In one example, a single peristaltic pump of a bank of pumps may be activated at a time, with a different pump corresponding with each storage container 122. Alternatively or additionally, the flow controller 112 may involve opening a single valve of a bank of valves at a time. In other cases, multiple pumps, valves, and/or other flow control elements may be operational concurrently.

The system 100 includes a recycle or return path 124 from one of the containers 122 to return one of the products to the feedstock chamber 102. The return path 124 may include a valve for integrating the recycled feedstock with an input line of the system 100. The valve may be controlled by the processor of the system controller 116 and/or another processor.

FIG. 2 depicts a heat exchanger assembly 200 in accordance with one example. The heat exchanger assembly 200 is configured as a stacked arrangement with a feedstock chamber 202. The heat exchanger assembly 200 may be used in the system 100 of FIG. 1 or another system.

The heat exchanger assembly 200 and the feedstock chamber 202 may be similar to the example shown in FIG. 1 in several aspects. For instance, the heat exchanger assembly 200 may include a cooling chamber 204 disposed adjacent to, or along, an upper side of the feedstock chamber 202 such that delivery of a cooling fluid to the cooling chamber 204 freezes the urinary feedstock from top to bottom within the feedstock chamber 202. The heat exchanger assembly 200 may also include a heating chamber 206 disposed adjacent to, or along, a lower side of the feedstock chamber 202 such that delivery of a heating fluid to the heating chamber 206 thaws the urinary feedstock from the bottom to the top within the feedstock chamber 202. In the example of FIG. 2, the cooling and heating chambers 204, 206 are configured as respective shells, but other configurations may be used. For instance, the thermal transfer elements of the heat exchanger assembly 200 may be configured as, or otherwise include, fins, tubes, coils, plates, and/or other components.

In the example of FIG. 2, the stacked arrangement of the feedstock chamber 202 and the cooling and heating chambers 204, 206 is disposed in an inclined orientation. As a result of the inclined orientation, the liquid drains out of the feedstock chamber 202 as the feedstock thaws. For example, the liquid may drain in a direction 208 as shown. The inclined orientation is depicted in FIG. 2 relative to vertical and horizontal axes. Each chamber 202, 204, 206 is oriented at an angle relative to the vertical and horizontal axes, as shown. The angle may vary. In other cases, the stacked arrangement is oriented vertically.

The inclined or vertical orientation may facilitate the removal of the thawed liquid. The thawed liquid may drain or flow downward toward one or more output ports 210 of the feedstock chamber 202. In the example of FIG. 2, the output port 210 is positioned at or along a lower edge of the feedstock chamber 202 as shown.

Figure 3:
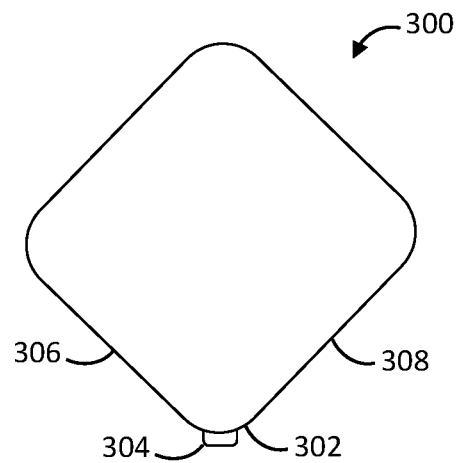
FIG. 3 is a schematic, elevational view of a feedstock chamber oriented and configured in accordance with one example.

FIG. 3 is an elevational view of a feedstock chamber 300 in accordance with one example. The feedstock chamber 300 may be used in the system 100 of FIG. 1 or another system, and/or in connection with the heat exchanger assembly 200 of FIG. 2 or another heat exchanger assembly. In this example, the feedstock chamber 300 is oriented such that a corner 302 of the chamber 300 is disposed at a low point in order to aid the flow of the thawed liquid into to one or more ports 304 located at the corner 302. Lower edges 306, 308 of the feedstock chamber 302 may be inclined relative to the horizontal axis as shown. The other chambers of the heat exchanger assembly (e.g., the cooling and heating chambers 204, 206 of the assembly 200 of FIG. 2) may be similarly oriented.

FIG. 3 depicts an example in which the feedstock chamber 300 includes a single port for both inflow and outflow. In such cases, charging and draining of the feedstock is achieved using the same port. In other cases, the feedstock chamber 300 may include multiple ports. For instance, the feedstock chamber 300 may include an inlet port and an outlet port. The outlet ports may be disposed along a lower edge of the feedstock chamber 300.

The number of ports may vary from the examples shown. For instance, one or more ports may be used for charging the feedstock chamber, and one or more ports may be used for draining the feedstock chamber. The port(s) used for outflow or draining may or may not be located at a bottom corner or other lower location of the chamber.

One or more elements of the above-described examples may not be stationary during operation. For instance, a stacked arrangement of a feedstock chamber and a thermal fluid transfer chamber may be tilted or flipped over after the freezing phase is completed. Once in the new orientation, the thermal fluid transfer chamber (or other cooling element) moves to the bottom of the feedstock chamber, e.g., for use as a heating shell. The heat exchanger assembly may accordingly include only a single thermal fluid transfer chamber or other element for both cooling (e.g., when above the feedstock chamber) and heating (e.g., when below the feedstock chamber). Alternative or additional operational aspects may also be non-stationary. For example, the feedstock chamber may also be flipped back and forth or otherwise shaken or agitated during the cooling and freezing process in order to, for instance, keep the contents of the feedstock chamber mixed, and/or encourage early initiation of crystallization.

Such crystallization may help avoid supercooling followed by flash freezing, which may adversely affect the performance of the system.

Figure 4:
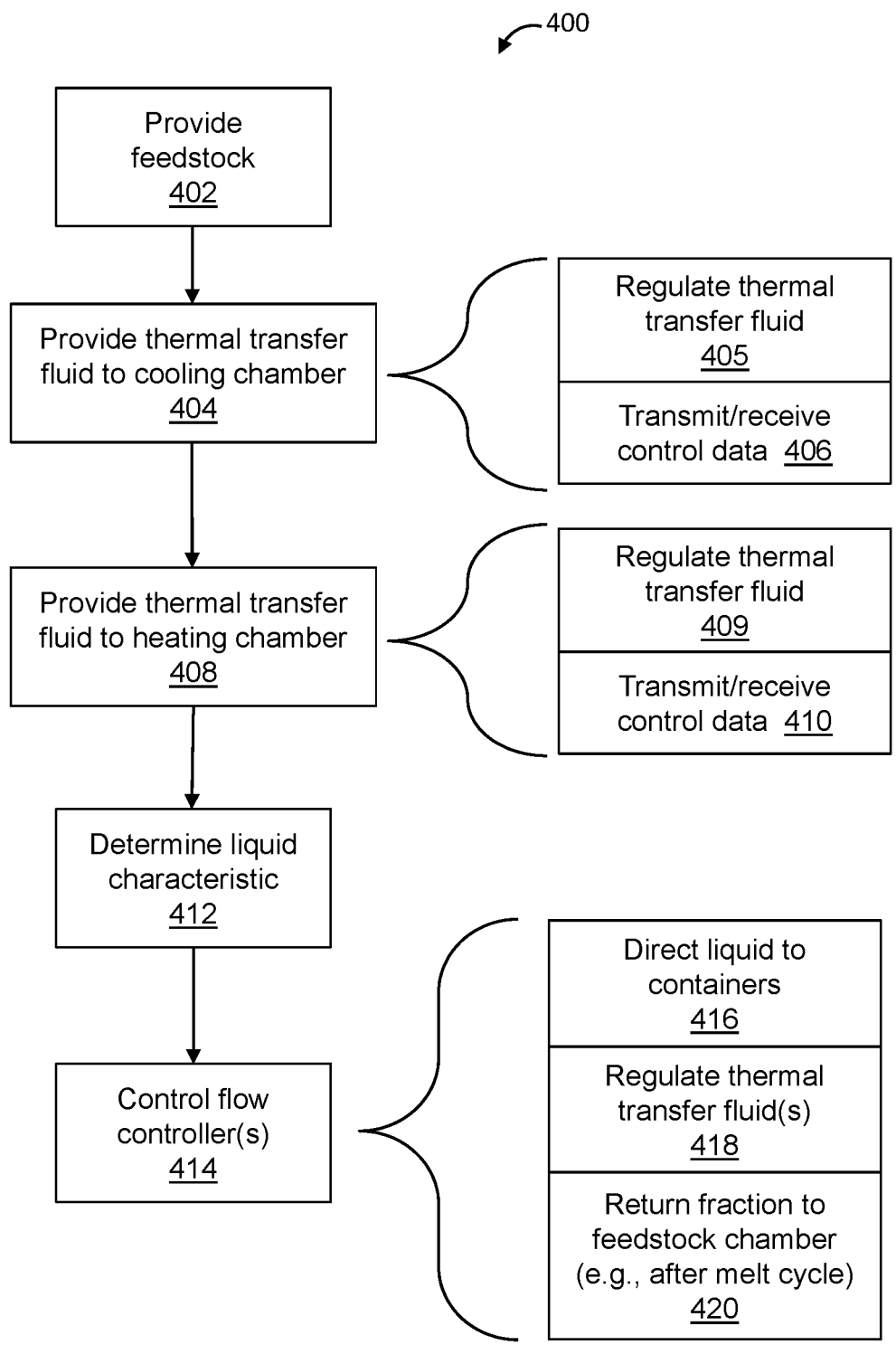
FIG. 4 is a flow diagram of a method of generating a concentrated product from a urinary feedstock in accordance with one example.

FIG. 4 depicts a method 400 of generating a concentrated product from a urinary feedstock in accordance with one example. The method 400 may be implemented by the system 100 of FIG. 1 or another system, and/or in connection with the heat exchanger assembly 202 of FIG. 2 or another heat exchanger assembly. For instance, the processor(s) of the system controller 116 shown in FIG. 1 may control a number of valves, pumps, and/or other flow control elements to implement the method 400. Alternative or additional system controllers or processors may be used to implement the method 400.

The method 400 may begin with an act 402 in which urinary feedstock is provided to a feedstock chamber. The feedstock may be provided as a liquid at ambient or another temperature.

The method 400 may include a number of acts directed to controlling a heat exchanger assembly, such as the examples of heat exchanger assemblies described above. For instance, in an act 404, thermal transfer fluid is provided to one or more thermal transfer fluid chambers to freeze the feedstock. In the example of FIG. 4, the thermal transfer fluid is provided to a cooling chamber, such as a cooling shell. Implementation of the act 404 results in the freezing (e.g., partial freezing) of the feedstock, e.g., a fraction of the feedstock, as described above. A variety of thermal transfer fluids may be used, including, for instance, glycol, water, and air. The act 404 may include regulating the temperature and/or flow of the thermal transfer fluid in an act 405. The regulation or other control of the thermal transfer fluid may be supported by one or more data communications in support of implementing an automated control system, as described above. For example, data may be transmitted to, and received from, a remote computer in an act 406. The data may be representative of one or more system parameters, including, for instance, one or more measured characteristics indicative of the solute concentration level.

After the feedstock has been frozen (e.g., partially frozen), a thermal transfer fluid is provided in an act 408 to one or more thermal transfer fluid chambers to thaw the feedstock. In the example of FIG. 4, the thermal transfer fluid is provided to a heating chamber, such as a heating shell. Implementation of the act 408 results in the thawing of the frozen feedstock, as described above. A variety of thermal transfer fluids may be used, including, for instance, glycol, water, and air. The act 408 may include regulating the temperature and/or flow of the thermal transfer fluid in an act 409. The regulation or other control of the thermal transfer fluid may again be supported by one or more data communications, including, for instance, the transmission to, and receipt from, a remote computer in an act 410.

In an act 412, one or more characteristics of the liquid are determined as the thawed feedstock exits the feedstock chamber. The liquid characteristic(s) is/are determined by one or more sensors. The liquid characteristic is indicative of the solute concentration level of the thawed feedstock. The configuration of the sensor(s) and/or the nature of the liquid characteristic may vary as described above.

The determined liquid characteristic(s) is/are then used in an act 414 to control one or more flow controllers. For instance, one or more valves, pumps, or other flow control elements of an output flow arrangement may be controlled. In the example of FIG. 4, the act 414 includes directing the thawed feedstock to one or more containers in an act 416. Alternatively or additionally, one or more valves, pumps, or other flow control elements used to regulate the flow of thermal transfer fluid(s) in an act 418. The act 414 may accordingly be directed to further control of a heat exchanger assembly or component thereof. The regulation and other control may include communications and other control procedures involving an automated control system or other remote computer, as described herein.

The act 414 may include controlling one or more additional flow controllers. For instance, one or more flow controllers may be controlled in an act 420 to return a fraction produced during the thawing of the feedstock back to the feedstock chamber. The fraction or product may be defined near the final stage of the melt or thawing cycle, such that the solute concentration of the thawed feedstock is too low for use as, e.g., fertilizer. Alternatively or additionally, one or more flow controllers may be used to remove (e.g., dump) the fraction produced in the final stage of the melt cycle.

The product may be returned to the feedstock chamber at various times. For instance, in some cases, the product may be pumped back or otherwise returned to the feedstock chamber after the melt cycle. For example, the return may occur once the melt cycle is complete, e.g., when the feedstock chamber is entirely empty. The product (or portion of the product) to be returned may be stored in one or more of the collection reservoirs until the melt cycle is complete and/or the feedstock chamber is otherwise ready to be refilled. Alternatively, the feedstock to be returned may be provided before or during the melt cycle, e.g., when the product has a relatively high solute concentration level not quite high enough for use, e.g., as fertilizer. The return product thus may or may not be provided (e.g., mixed) with new feedstock charge.

The acts of the method 400 may be implemented in an order other than that shown. For instance, the liquid characteristic determination of the act 412 may be implemented concurrently with the provision of thermal transfer fluid in the act 408 and/or the control of the flow controller(s) in the act 414. The solute concentration level may thereby be used to regulate the provision of thermal transfer fluid.

The term "urinary feedstock" is used herein in a broad sense to include various types of urine and urine-based feedstocks. A urinary feedstock may include a feedstock including urine and/or urine-based products. A urinary feedstock may also include non-urine components. For instance, the urinary feedstock may include one or more additives, such as acid or flushwater. Alternatively or additionally, the urinary feedstock may be derived from urine after one or more pretreatments. In some cases, the pretreatment(s) may be biological in nature. In other cases, the pretreatment may include a non-biological process, such as reverse osmosis. The pretreatment(s) may alter the urine in various ways, including, for instance, partial concentration.

Although described in connection with human urine feedstocks and fertilizer products, the disclosed systems and methods are useful with a wide variety of urinary feedstocks. The systems and methods may be applied to other urine feedstocks. The systems and methods may be used to generate non-fertilizer products. The disclosed systems and methods may be useful in a wide variety of applications, including applications not involving urinary feedstocks. For example, the disclosed systems and methods may be used to process other waste feedstocks, such as centrate from a wastewater plant or leachate from a composting toilet, or non-waste feedstocks like foods or pharmaceuticals.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A system for generating a concentrated product from a feedstock, the system comprising:
   a feedstock chamber to which the feedstock is provided;
   a heat exchanger assembly in thermal communication with the feedstock chamber, the heat exchanger assembly being configured to freeze the feedstock in the feedstock chamber;
   an output flow arrangement configured to carry liquid from the feedstock chamber as the feedstock thaws, the output flow arrangement comprising a flow controller;
   a sensor disposed along the output flow arrangement or the heat exchanger assembly, the sensor being configured to measure a characteristic of the liquid or the heat exchanger assembly, the characteristic being indicative of a solute concentration level of the liquid; and
   a processor responsive to the characteristic and configured to control the flow controller to, based on the solute concentration level, direct the liquid passing through the output flow arrangement to define a plurality of products at different concentration levels, the plurality of products comprising the concentrated product.

2. The system of claim 1, wherein the output flow arrangement comprises a plurality of output paths through which the plurality of products are directed, respectively.

3. The system of claim 2, wherein the flow controller comprises a set of pumps, each pump of the set of pumps providing the liquid to a respective one of the plurality of output paths.

4. The system of claim 1, wherein the heat exchanger assembly comprises a thermal transfer fluid chamber to which a thermal transfer fluid is provided.

5. The system of claim 4, wherein each of the feedstock chamber and the thermal transfer fluid chamber comprises a respective shell, the respective shells of the feedstock chamber and the thermal transfer fluid chamber are stacked.

6. The system of claim 4, wherein the thermal transfer fluid chamber is adjacent an upper side of the feedstock chamber such that the feedstock freezes in the feedstock chamber from top to bottom.

7. The system of claim 4, wherein the system controller is configured to regulate thermal transfer fluid flow to the thermal transfer fluid chamber such that the feedstock does not completely freeze before thawing.

8. The system of claim 1, wherein:
   the heat exchanger assembly comprises first and second thermal transfer fluid chambers;
   the first and second thermal transfer fluid chambers are disposed on opposite sides of the feedstock chamber; and
   first and second thermal transfer fluids are provided to the first and second thermal transfer fluid chambers to freeze and thaw the feedstock in the feedstock chamber, respectively.

9. The system of claim 1, wherein the processor is further configured to regulate thermal transfer fluid flow through the heat exchanger assembly to control rates of freezing and thawing of the feedstock based on the characteristic.

10. The system of claim 1, wherein the feedstock chamber comprises a flexible bag.

11. The system of claim 1, wherein the sensor comprises a conductivity sensor immersed in the liquid in the output flow arrangement.

12. The system of claim 1, wherein the sensor comprises a temperature sensor.

13. The system of claim 1, wherein the heat exchanger assembly is disposed on an inclined orientation such that the liquid drains out of the feedstock chamber as the feedstock thaws.

14. A heat exchanger assembly for generating a concentrated product from a urinary feedstock, the heat exchanger assembly comprising:
   a feedstock chamber;
   a cooling chamber disposed along an upper side of the feedstock chamber such that delivery of a cooling fluid to the cooling chamber freezes the urinary feedstock from top to bottom within the feedstock chamber; and
   a heating chamber disposed along a lower side of the feedstock chamber such that delivery of a heating fluid to the heating chamber thaws the urinary feedstock from the bottom to the top within the feedstock chamber.

* * * * *